US010779335B2

(12) United States Patent
Suzuki et al.

(10) Patent No.: US 10,779,335 B2
(45) Date of Patent: Sep. 15, 2020

(54) COMMUNICATION DEVICE ESTABLISHING WIRELESS CONNECTION WITH TERMINAL DEVICE AND NON-TRANSITORY COMPUTER-READABLE MEDIUM FOR TERMINAL DEVICE ESTABLISHING WIRELESS CONNECTION WITH COMMUNICATION DEVICE

(71) Applicant: Brother Kogyo Kabushiki Kaisha, Nagoya-shi, Aichi-ken (JP)

(72) Inventors: Satoshi Suzuki, Nagoya (JP); Hirotaka Asakura, Nagoya (JP); Yusuke Shimada, Owariasahi (JP); Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 82 days.

(21) Appl. No.: 15/899,922

(22) Filed: Feb. 20, 2018

(65) Prior Publication Data
US 2018/0242378 A1     Aug. 23, 2018

(30) Foreign Application Priority Data
Feb. 21, 2017   (JP) ................. 2017-030256

(51) Int. Cl.
    *H04W 76/10*     (2018.01)
    *H04W 4/80*     (2018.01)
    (Continued)

(52) U.S. Cl.
    CPC ............ *H04W 76/10* (2018.02); *H04W 4/80* (2018.02); *H04W 12/003* (2019.01);
    (Continued)

(58) Field of Classification Search
None
See application file for complete search history.

(56) References Cited

U.S. PATENT DOCUMENTS 9,591,582 B1 *   3/2017   Rabii .................. H04W 52/028
2014/0071850 A1 *   3/2014   Abraham ............. H04W 48/20
                                                      370/254
(Continued)

FOREIGN PATENT DOCUMENTS

JP       2017-017601 A     1/2017

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Donald L Mills
(74) *Attorney, Agent, or Firm* — Banner & Witcoff, Ltd.

(57) ABSTRACT

A communication device may, in response to a wireless link via a first wireless interface being established with a terminal device while the communication device is a first parent station state, receive predetermined information from the terminal device via a second wireless interface, if the predetermined information is received, shift the communication device from the first parent station state to a second parent station state, wherein the communication device is maintained in the first parent station state if the predetermined information is not received even if the wireless link via the first wireless interface has been established with the terminal device and after the communication device has been shifted to the second parent station state, establish a first wireless connection via the second wireless interface with the terminal device so as to cause the terminal device to participate in the second wireless network as a child station.

19 Claims, 4 Drawing Sheets

(51) Int. Cl.
*H04W 12/00* (2009.01)
*H04W 88/06* (2009.01)
*H04W 84/12* (2009.01)
*H04W 12/06* (2009.01)

(52) U.S. Cl.
CPC ............ *H04W 12/06* (2013.01); *H04W 84/12* (2013.01); *H04W 88/06* (2013.01)

(56) References Cited

U.S. PATENT DOCUMENTS

| | | | |
|---|---|---|---|
| 2015/0124647 A1* | 5/2015 | Jafarian | H04W 84/18 370/254 |
| 2015/0296416 A1* | 10/2015 | Lee | H04W 8/005 370/331 |
| 2015/0350334 A1* | 12/2015 | Liu | H04L 67/141 709/227 |
| 2016/0004489 A1* | 1/2016 | Yamada | G06F 3/1236 358/1.15 |
| 2016/0094662 A1* | 3/2016 | Kollu | H04W 48/18 709/224 |
| 2016/0113048 A1* | 4/2016 | Barathalwar | H04W 8/005 455/11.1 |
| 2016/0119579 A1* | 4/2016 | Sakai | H04L 67/16 370/338 |
| 2016/0203393 A1* | 7/2016 | Amano | H04W 36/0011 358/1.15 |
| 2017/0005876 A1 | 1/2017 | Shibata | |
| 2017/0094717 A1* | 3/2017 | Yang | H04W 88/04 |
| 2017/0317737 A1* | 11/2017 | Niu | H04L 65/4076 |
| 2018/0042011 A1* | 2/2018 | Lim | H04L 43/0864 |
| 2018/0124654 A1* | 5/2018 | Kim | H04L 29/08 |

\* cited by examiner

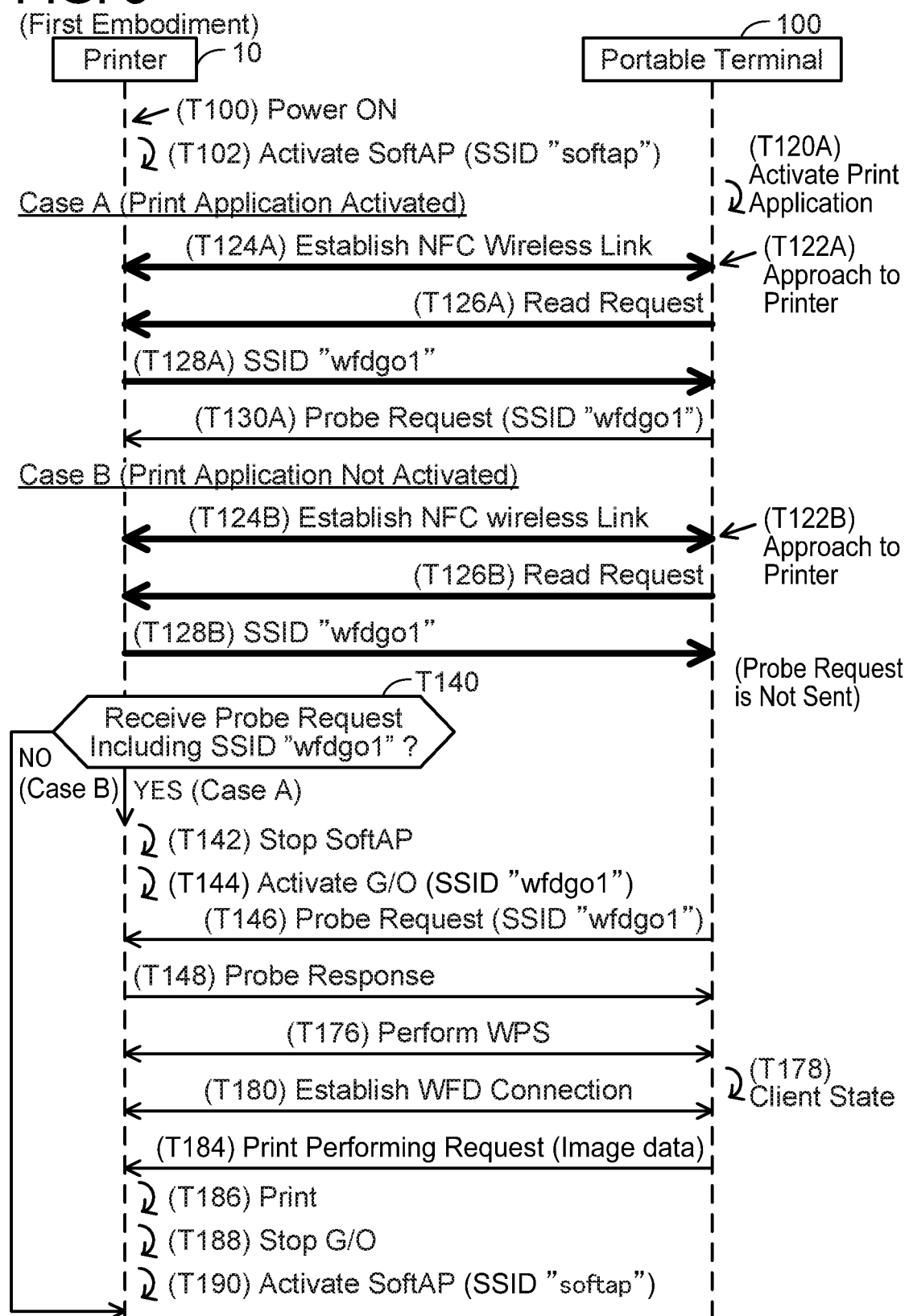

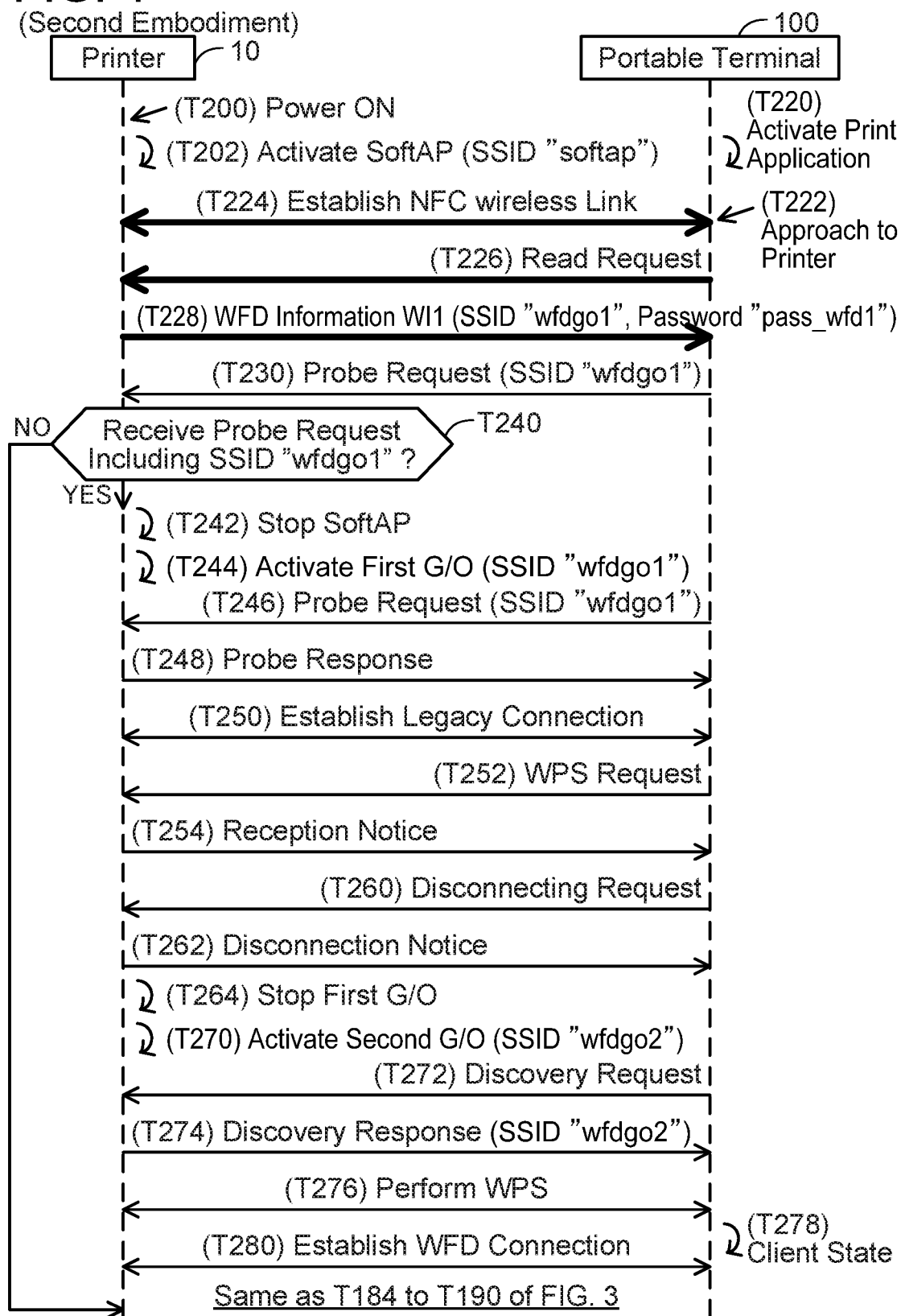

COMMUNICATION DEVICE ESTABLISHING WIRELESS CONNECTION WITH TERMINAL DEVICE AND NON-TRANSITORY COMPUTER-READABLE MEDIUM FOR TERMINAL DEVICE ESTABLISHING WIRELESS CONNECTION WITH COMMUNICATION DEVICE

TECHNICAL FIELD

The present disclosure discloses a communication device capable of operating as a parent station of a wireless network and a terminal device capable of participating in the wireless network as a child station.

DESCRIPTION OF RELATED ART

Various techniques for forming a wireless network by a communication device are known. For example, a communication device supporting a so-called SoftAP function can activate a SoftAP and operate as a parent station of a wireless network. In addition, a communication device supporting a WFD (abbreviation of Wi-Fi Direct (registered trademark)) scheme formulated by the Wi-Fi Alliance can shift to a G/O (abbreviation of Group Owner) state according to the WFD scheme to operate as a parent station of a wireless network. While operating as a parent station of a wireless network, the communication device can establish a wireless connection with another device and cause the device participate in the wireless network as a child station.

SUMMARY

For example, a situation is conceivable where a communication device operates as a parent station of a wireless network for a certain purpose. In this case, for example, when a terminal device participates in the wireless network as a child station in order to achieve a purpose that differs from the certain purpose, the communication device may not be able to appropriately achieve the different purpose. The present disclosure provides a communication device that may appropriately achieve a purpose desired by a terminal device.

A communication device disclosed herein may comprise: a first wireless interface; a second wireless interface being different from the first wireless interface; a processor; and a memory configured to store computer-readable instructions therein, the computer-readable instructions, when executed by the processor, causing the communication device to: in response to a wireless link via the first wireless interface being established with a terminal device while a state of the communication device is a first parent station state, receive predetermined information from the terminal device via the second wireless interface, the first parent station state being a state where the communication device operates as a parent station of a first wireless network identified by a first network identifier, the first wireless network being for performing a wireless communication via the second wireless interface; in a case where the predetermined information is received, shift the state of the communication device from the first parent station state to a second parent station state, the second parent station state being a state where the communication device operates, not as the parent station of the first wireless network, as a parent station of a second wireless network being identified by a second network identifier different from the first network identifier, the second wireless network being for performing a wireless communication via the second wireless interface, wherein the state of the communication device is maintained in the first parent station state in a case where the predetermined information is not received even if the wireless link via the first wireless interface has been established with the terminal device while the state of the communication device is the first parent station state; and after the state of the communication device has been shifted from the first parent station state to the second parent station state, establish a first wireless connection via the second wireless interface with the terminal device so as to cause the terminal device to participate in the second wireless network as a child station.

A non-transitory computer-readable medium storing computer-readable instructions for a terminal device is further disclosed herein. The computer-readable instructions may, when executed by a processor of the terminal device, cause the terminal device to; in response to a wireless link via a first wireless interface of the terminal device being established with a communication device while a state of the communication device is a first parent station state, send predetermined information to the communication device via a second wireless interface of the terminal device, the first parent station state being a state where the communication device operates as a parent station of a first wireless network identified by a first network identifier, the second wireless interface being different from the first wireless interface, the predetermined information being information for shifting the state of the communication device from the first parent station state to a second parent station state, the second parent station state being a state where the communication device operates as a parent station of a second wireless network identified by a second network identifier different from the first network identifier; and after the state of the communication device has been shifted from the first parent station state to the second parent station state, establish a first wireless connection via the second wireless interface with the communication device so as to participate in the second wireless network as a child station.

A control method and computer-readable instructions for implementation of the communication device described above, and a non-transitory computer-readable recording medium in which the computer-readable instructions are stored, are also novel and useful. The terminal device itself and a control method for implementation of the terminal device are also novel and useful.

BRIEF DESCRIPTION OF THE DRAWINGS

FIG. 3 shows a sequence diagram of a case where the printer establishes a wireless connection according to the WFD scheme with a portable terminal; and FIG. 4 shows a sequence diagram according to a second embodiment.

EMBODIMENTS

Figure 1:
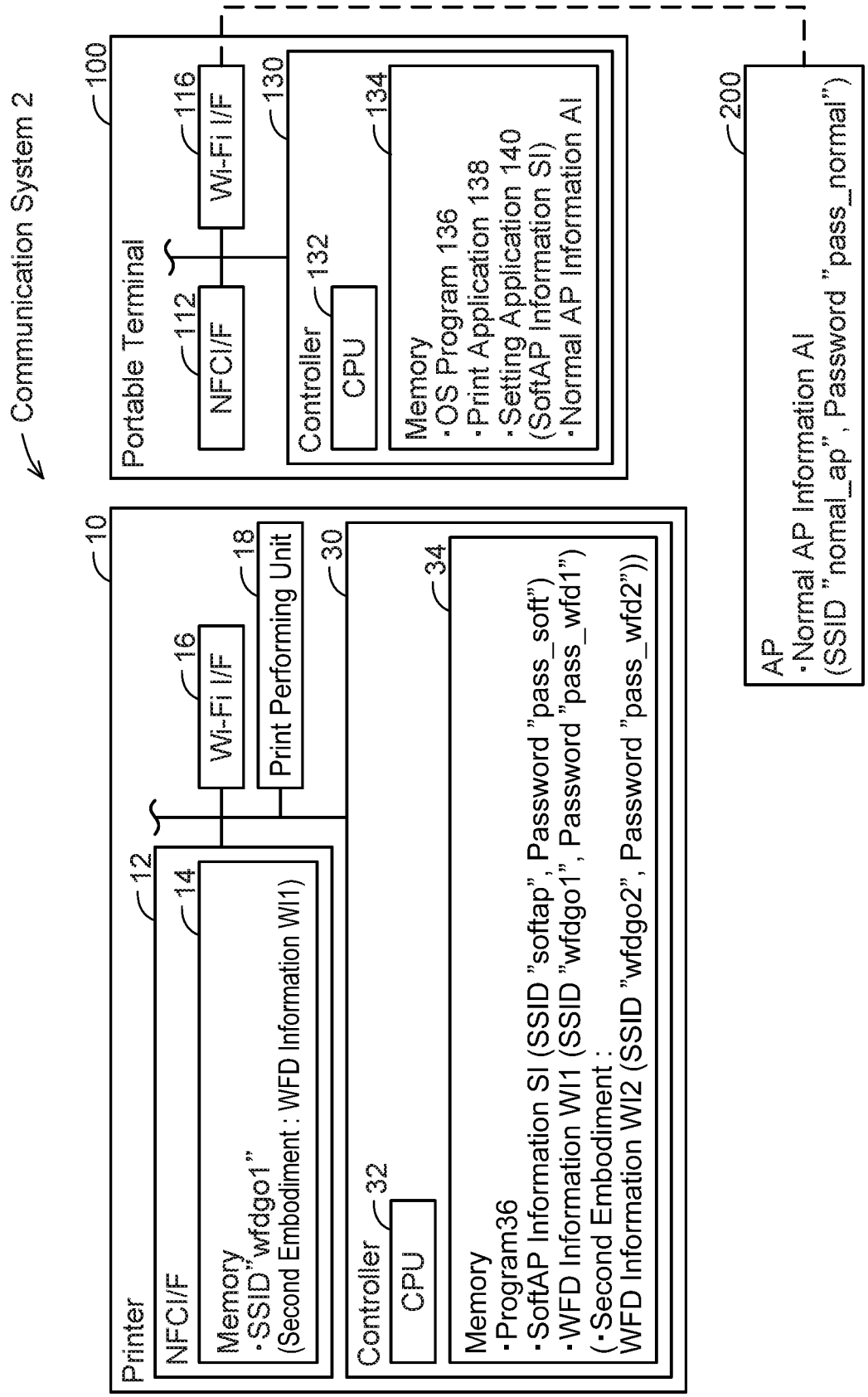
FIG. 1 shows a configuration of a communication system.

First Embodiment (Configuration of Communication System 2: FIG. 1)

As shown in FIG. 1, a communication system 2 includes a printer 10, a portable terminal 100, and an access point 200. Hereinafter, the access point 200 will be referred to as an AP (abbreviation of Access Point) 200.

(Configuration of Printer 10: FIG. 1)

The printer 10 is a peripheral device (i.e., a peripheral device of the portable terminal 100 and the like) capable of performing a print function. The printer 10 includes an NFC interface 12, a Wi-Fi interface 16, a print performing unit 18, and a controller 30. Hereinafter, an interface will be referred to as an "I/F".

The NFC I/F 12 is an I/F for performing a wireless communication according to an NFC scheme. The NFC scheme is a wireless communication scheme based on, for example, an international standard such as ISO/IEC 21481 or ISO/IEC 18092. The NFC I/F 12 includes a memory 14. The memory 14 stores an SSID "wfdgo1" (to be described later) to be sent outward. The SSID "wfdgo1" is stored in the memory 14 when power of the printer 10 is turned on. The NFC I/F 12 is an NFC tag. It should be noted, in a modification, the NFC I/F 12 may be an NFC forum device.

The Wi-Fi I/F 16 is an I/F for performing a wireless communication according to a Wi-Fi scheme. The Wi-Fi scheme is a wireless communication scheme which conforms to a standard formulated by the Wi-Fi Alliance and which is based on, for example, the standard of the IEEE (abbreviation of The Institute of Electrical and Electronics Engineers, Inc.) 802.11 and standards conforming thereto (for example, 802.11a, 11b, 11g, and 11n). In particular, the Wi-Fi I/F 16 supports a SoftAP (abbreviation of Software Access Point) scheme. The Wi-Fi I/F 16 further supports a WFD (abbreviation of Wi-Fi Direct (registered trademark)) scheme. Details of the WFD scheme are described in written standards "Wi-Fi Peer-to-Peer (P2P) Technical Specification Version 1.1" created by the Wi-Fi Alliance.

The Wi-Fi I/F 16 includes a single chip for performing both a wireless communication according to the SoftAP scheme and a wireless communication according to the WFD scheme. Therefore, the Wi-Fi I/F 16 cannot simultaneously perform a wireless communication according to the SoftAP scheme and a wireless communication according to the WFD scheme. In other words, the printer 10 cannot operate as a G/O (abbreviation of Group Owner) that is a parent station according to the WFD scheme, for example, while operating as a SoftAP. Further the printer 10 cannot operate as the SoftAP while operating as the G/O. However, in a modification, the Wi-Fi I/F 16 may include two chips, one of which is for performing a wireless communication according to the SoftAP scheme and the other of which is for performing a wireless communication according to the WFD scheme. In other words, the Wi-Fi I/F 16 may be capable of simultaneously performing a wireless communication according to the SoftAP scheme and a wireless communication according to the WFD scheme.

In addition, the Wi-Fi I/F 16 supports WPS (abbreviation of Wi-Fi Protected Setup) formulated by the Wi-Fi Alliance. The WPS is what is commonly known as an automatic wireless setup or a simple wireless setup, and is a technique that enables a wireless connection according to the Wi-Fi scheme to be easily established between a pair of devices even when information for establishing a wireless connection according to the Wi-Fi scheme (such as an SSID (abbreviation of Service Set Identifier), a password, an authentication scheme, and an encryption scheme) is not inputted by a user.

Here, differences between the NFC I/F 12 and the Wi-Fi I/F 16 will now be described. A communication speed of a wireless communication via the Wi-Fi I/F 16 (for example, a maximum communication speed of 11 to 600 Mbps) is faster than a communication speed of a wireless communication via the NFC I/F 12 (for example, a maximum communication speed of 100 to 424 Kbps). In addition, a frequency of a carrier wave in a wireless communication via the Wi-Fi I/F 16 (for example, 2.4 GHz band or 5.0 GHz band) is different from a frequency of a carrier wave in a wireless communication via the NFC I/F 12 (for example, 13.56 MHz band). Furthermore, a maximum distance with which a wireless communication via the Wi-Fi I/F 16 can be performed (for example, a maximum distance of approximately 100 m) is greater than a maximum distance with which a wireless communication via the NFC I/F 12 can be performed (for example, a maximum distance of approximately 10 cm).

The controller 30 includes a CPU 32 and a memory 34. The CPU 32 performs various processes in accordance with a program 36 in the memory 34. The memory 34 is constituted of a ROM, a RAM, or the like. In addition to the program 36, the memory 34 also stores SoftAP information SI and WFD information WI1.

The SoftAP information SI is wireless setting information used in a wireless network that is formed by the printer 10 operating as a SoftAP (hereinafter, referred to as "SoftAPNW"). While operating as the parent station of the SoftAPNW (in other words, as the SoftAP), the printer 10 can establish a wireless connection (hereinafter, referred to as "SoftAP connection") with, for example, the portable terminal 100 using the SoftAP information SI and cause the portable terminal 100 to participate in the SoftAPNW as a child station. The SoftAP information SI includes an SSID "softap" and a password "pass_soft". The SSID is an identifier for identifying a wireless network. The password is information used for authentication and encryption in a wireless network. The SoftAP information SI is stored in advance in the memory 34 prior to the shipment of the printer 10 in the present embodiment, however, in a modification, the SoftAP information SI may be installed to the memory 34, for example, from a server on the Internet after the shipment of the printer 10.

The WFD information WI1 is wireless setting information used in a wireless network that is formed by the printer 10 operating as the G/O of the WFD scheme (hereinafter, referred to as "WFDNW"). While operating as the parent station of the WFDNW (in other words, as the G/O), the printer 10 can establish a wireless connection (hereinafter, referred to as "WFD connection") with, for example, the portable terminal 100 using the WFD information WI1 and cause the portable terminal 100 participate in the WFDNW as a child station. The WFD information WI1 includes the SSID "wfdgo1" and a password "pass_wfd1". The SSID "wfdgo1" and the password "pass_wfd1" are respectively different from the SSID "softap" and the password "pass_soft" included in the SoftAP information SI. The WFD information WI1 is stored in advance in the memory 34 prior to the shipment of the printer 10 in the present embodiment, however, in a modification, the WFD information WI1 may be generated by the CPU 32 and stored in the memory 34 at a predetermined timing, such as at a time of turning on the power of the printer 10.

The SoftAPNW and the WFDNW are used to achieve purposes that are different from each other. For example, the SoftAPNW is used to achieve a purpose of the printer 10 acquiring wireless setting information for participating in a wireless network formed by the AP 200 (hereinafter, referred to as "normal APNW"). In addition, for example, the WFDNW is used to achieve a purpose of the portable terminal 100 causing the printer 10 to perform printing.

(Configuration of Portable Terminal 100: FIG. 1)

The portable terminal 100 is a portable terminal device such as a portable phone (for example, a smartphone), a PDA, and a tablet terminal. The portable terminal 100 includes an NFC I/F 112, a Wi-Fi I/F 116, and a controller 130. The NFC I/F 112 is an I/F for performing a wireless communication according to the NFC scheme. The NFC I/F 112 is an NFC forum device. The Wi-Fi I/F 116 is an I/F for performing a wireless communication according to the Wi-Fi scheme.

The controller 130 includes a CPU 132 and a memory 134. The CPU 132 performs various processes in accordance with an OS (abbreviation of Operating System) program 136 in the memory 134. In the state shown in FIG. 1, the portable terminal 100 has established a wireless connection with the AP 200 (hereinafter, referred to as "normal AP connection") via the Wi-Fi I/F 116, and is participating, as a child station, in a normal APNW formed by the AP 200. The memory 134 stores normal AP information AI that is wireless setting information used in the normal APNW. The normal AP information AI includes an SSID "normal_ap" and a password "pass_normal". The SSID "normal_ap" and the password "pass_normal" are respectively different from the SSIDs and the passwords included in the SoftAP information SI and the WFD information WI1.

The memory 134 further stores a print application 138 and a setting application 140. The print application 138 is an application for causing the printer 10 to perform printing. The setting application 140 is an application for sending the normal AP information AI in the memory 134 to the printer 10, and causing the printer 10 to participate in the normal APNW as a child station. The SoftAP information SI is described in the setting application 140 in advance. The respective applications 138 and 140 are provided by a vendor of the printer 10. The portable terminal 100 may install the respective applications 138 and 140, for example, from a medium shipped together with the printer 10, or may install the respective applications 138 and 140 from a server (not illustrated) on the Internet.

(Configuration of AP 200: FIG. 1)

The AP 200 is a known AP called a wireless AP, a wireless LAN router, and the like. The AP 200 has established a normal APNW in which the normal AP information AI (in other words, the SSID "normal_ap" and the password "pass_normal") is used, and in the state shown in FIG. 1, the AP 200 has established the normal AP connection with the portable terminal 100.

Figure 2:
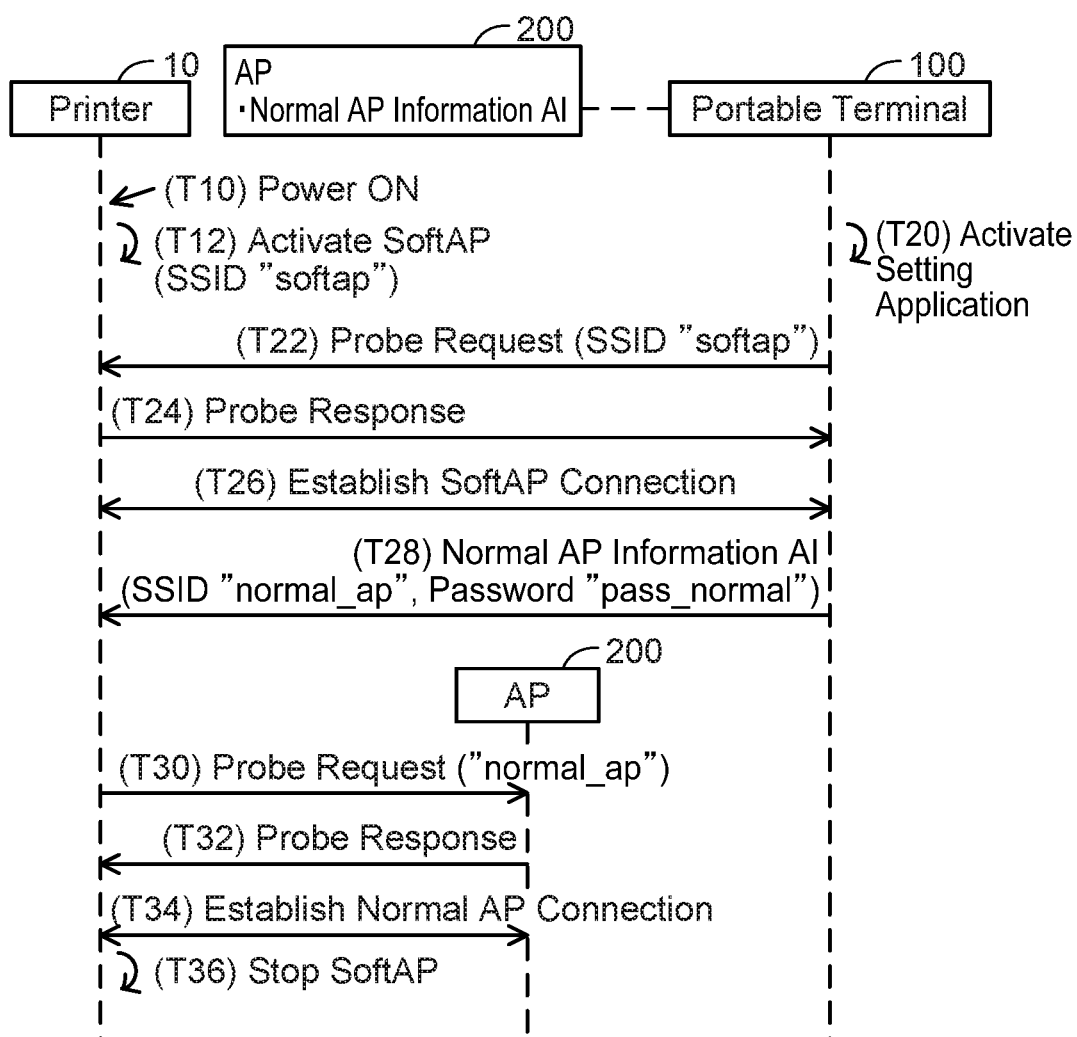
FIG. 2 shows a sequence diagram of a case where a printer establishes a wireless connection with an access point.

(Process By Which Printer 10 Establishes Normal AP Connection: FIG. 2)

Contents of a process by which the printer 10 establishes a normal AP connection with the AP 200 will now be described with reference to FIG. 2. In the present embodiment, a situation is assumed in which a user has newly purchased the printer 10 and the user is to establish a normal AP connection between the printer 10 and the AP 200 which has been already installed in a residence, a workplace, or the like. It should be noted that, hereinbelow, in descriptions of processes performed by the CPUs 32 and 132 of the devices 10 and 100 in accordance with the programs 36 and 136 to 140, the CPUs will not be described as a subject, but the devices (in other words, the printer 10 and the portable terminal 100) will be described as a subject.

In T10, the user turns on the power of the printer 10. In this case, in T12, the printer 10 activates the SoftAP and forms a SoftAPNW that is identified by the SSID "softap". Since the SoftAP is automatically activated in response to the power of the printer 10 being turned on, the user need not perform an operation for activating the SoftAP after performing the power ON operation, and thus user convenience is improved. It should be noted that, although the printer 10 automatically activates the SoftAP (T12) when power is turned on for the first time after the shipment of the printer 10, the printer 10 may not automatically activate the SoftAP when the power is turned on after a normal AP connection has been established with the AP 200 (in other words, after the normal AP information AI has been stored in the memory 34).

For example, when the user desires the printer 10 to participate in a normal APNW, in T20, an operation for activating the setting application 140 is performed on the portable terminal 100. Accordingly, the following processes are realized by the setting application 140. In T22, the portable terminal 100 acquires the SoftAP information SI (in other words, the SSID "softap" and the password "pass_soft") described in advance in the setting application 140 in the memory 134, and sends a Probe request including the SSID "softap" to the printer 10 via the Wi-Fi I/F 116. The Probe request is a command for requesting the printer 10 to participate in the normal APNW.

In response to receiving the Probe request including the SSID "softap" via the Wi-Fi I/F 16 in T22, the printer 10 sends a Probe response to the portable terminal 100 via the Wi-Fi I/F 16 in T24.

In T26, the printer 10 performs communications of various signals (for example, an Authentication signal, an Association signal, and a 4-way handshake) with the portable terminal 100 via the Wi-Fi I/F 16. In the course of the various communications described above, the printer 10 receives the password "pass_soft" included in the SoftAP information SI from the portable terminal 100, and performs an authentication of the password. Since the authentication of the password succeeds, the printer 10 establishes a SoftAP connection with the portable terminal 100. Accordingly, the printer 10 can cause the portable terminal 100 to participate in the SoftAPNW as a child station.

From the perspective of the portable terminal 100, in T24, the portable terminal 100 receives the Probe response from the printer 10 via the Wi-Fi I/F 116, and in T26, performs the communications of the various signals with the printer 10 via the Wi-Fi I/F 116. Accordingly, the portable terminal 100 establishes the SoftAP connection with the printer 10, and participates in the SoftAPNW as a child station.

In T28, using the SoftAPNW, the portable terminal 100 sends the normal AP information AI in the memory 134 to the printer 10 via the Wi-Fi I/F 116.

In response to receiving the normal AP information AI using the SoftAPNW from the portable terminal 100 via the Wi-Fi I/F 16 in T28, the printer 10 sends, to the AP 200 via the Wi-Fi I/F 16, a Probe request including the SSID "normal_ap" included in the normal AP information AI in T30. Subsequently, in T32, the printer 10 receives a Probe response from the AP 200.

In T34, the printer 10 performs communications of various signals (for example, an Authentication signal, an Association signal, and a 4-way handshake) with the AP 200. In the course of the various communications described above, the printer 10 sends the password "pass_normal" included in the normal AP information AI received in T28 to the AP 200. Since an authentication of the password succeeds at the AP 200, the printer 10 establishes a normal AP connection with the AP 200. Accordingly, the printer 10 can participate in the normal APNW as a child station. As a result, the printer 10 can perform various communications with another device (for example, the portable terminal 100) via the AP 200.

In T36, the printer 10 stops the SoftAP and causes the SoftAPNW to disappear. Accordingly, the SoftAP connection established in T26 is disconnected.

(Process By Which Printer 10 Establishes WFD Connection: FIG. 3)

Next, contents of a process by which the printer 10 establishes a WFD connection with the portable terminal 100 in a situation where the SoftAP is activated on the printer 10 will now be described with reference to FIG. 3. In FIG. 3, bold-line arrows and fine-line arrows between the printer 10 and the portable terminal 100 respectively denote wireless communications according to the NFC scheme and wireless communications according to the Wi-Fi scheme. T100 and T102 are respectively same as T10 and T12 shown in FIG. 2.

A case A where the print application 138 is activated on the portable terminal 100 will be described. For example, when the user desires the printer 10 to perform printing, in T120A, an operation for activating the print application 138 is performed on the portable terminal 100. Accordingly, the following processes except T124A to T128A (for example, T130A and T146) are realized by the print application 138. It should be noted that a communication with the printer 10 via the Wi-Fi I/F 116 such as T130A is realized by the print application 138 appropriately supplying instructions to the OS program 136.

In T122A, the user brings the portable terminal 100 close to the printer 10. Accordingly, a distance between the NFC I/F 112 of the portable terminal 100 and the NFC I/F 12 of the printer 10 becomes equal to or shorter than the distance with which a wireless communication according to the NFC scheme can be performed (for example, 10 cm), and in T124A, an NFC wireless link is established between the portable terminal 100 and the printer 10. It should be noted that the processes of T124A and subsequent T126A to T128A are realized not by the print application 138 supplying instructions to the OS program 136, but by the OS program 136 and the NFC I/F 112 operating in accordance with rules determined in advance.

In T126A, using the NFC wireless link established in T124A, the portable terminal 100 sends a Read request to the printer 10 via the NFC I/F 112. The Read request is a request for reading (in other words, receiving) information stored in the memory 14 of the NFC I/F 12 of the printer 10.

In response to receiving the Read request from the portable terminal 100 in T126A, the NFC I/F 12 of the printer 10 sends, using the NFC wireless link established in T124A, the SSID "wfdgo1" in the memory 14 to the portable terminal 100 in T128A. Accordingly, the printer 10 can notify the portable terminal 100 of the SSID "wfdgo1" for participating in a WFDNW in which the printer 10 operates as the parent station (in other words, the G/O).

In T128A, using the NFC wireless link established in T124A, the NFC I/F 112 of the portable terminal 100 receives the SSID "wfdgo1" from the printer 10. In response thereto, in T130A, the portable terminal 100 sends a Probe request including the received SSID "wfdgo1" to the printer 10 via the Wi-Fi I/F 116. The Probe request is a command for notifying the printer 10 that the portable terminal 100 desires to participate in the WFDNW in which the printer 10 operates as the parent station (in other words, the G/O).

A case B where the print application 138 is not activated on the portable terminal 100 will now be described. In the present case, the operation for activating the print application 138 is not performed on the portable terminal 100. For example, in a situation where an application that is different from the print application 138 is activated, an NFC wireless link may be established between the portable terminal 100 and the printer 10 even without activating the print application 138. T122B to T128B are same as T122A to T128A in the case A. In the present case, since the print application 138 is not activated, even if the portable terminal 100 receives the SSID "wfdgo1" in T128B, the portable terminal 100 does not send the Probe request including the SSID "wfdgo1" to the printer 10.

In T140, in response to the NFC wireless link being established, the printer 10 determines whether or not the Probe request including the SSID "wfdgo1" is received via the Wi-Fi I/F 16 (in other words, the printer 10 monitors whether or not the Probe request is received). In the aforementioned case A in which the Probe request including the SSID "wfdgo1" is received, the printer 10 determines YES in T140, and performs processes of T142 and thereafter. On the other hand, in the aforementioned case B in which the Probe request including the SSID "wfdgo1" is not received, the printer 10 determines NO in T140, and skips the processes of T142 and thereafter. Accordingly, the printer 10 continues to operate as the SoftAP, and maintains the state where the SoftAPNW is formed. As a result, the printer 10 can appropriately achieve the purpose of acquiring the normal AP information AI for participating in the normal APNW from the portable terminal 100 (refer to FIG. 2).

In the case where the printer 10 determines that the Probe request including the SSID "wfdgo1" has been received (YES in T140), in T142, the printer 10 stops the SoftAP and causes the SoftAPNW to disappear. Accordingly, a state of the printer 10 shifts from the state where the printer 10 operates as the SoftAP to a state where the printer 10 does not operate as a parent station of a wireless network. As described above, in the present embodiment, the Wi-Fi I/F 16 cannot simultaneously perform a wireless communication according to the SoftAP scheme and a wireless communication according to the WFD scheme. Since the printer 10 needs to activate a G/O according to the WFD scheme in a process of T144 to be described later, the printer 10 stops the SoftAP in T142. It should be noted that, even in a case where the Wi-Fi I/F 16 can simultaneously perform a wireless communication according to the SoftAP scheme and a wireless communication according to the WFD scheme, the printer 10 may stop the SoftAP in T142.

In T144, the printer 10 activates the G/O according to the WFD scheme, and forms a WFDNW that is identified by the SSID "wfdgo1". Accordingly, the state of the printer 10 shifts from the state where the printer 10 does not operate as a parent station of a wireless network to a G/O state where the printer 10 operates as the parent station of the WFDNW identified by the SSID "wfdgo1". In other words, the Probe request received in T130A is information for shifting the state of the printer 10 from the state where the printer 10 operates as the parent station of the SoftAPNW (in other words, as the SoftAP), through the state where the printer 10 does not operate as a parent station of a wireless network, to the state where the printer 10 operates as the parent station of the WFDNW (in other words, as the G/O).

It should be noted, since the state of the printer 10 is not the G/O state at the time of T130A, in other words, since the WFDNW identified by the SSID "wfdgo1" is not formed yet, the printer 10 does not send a Probe response even when receiving the Probe request including the SSID "wfdgo1". Therefore, since the portable terminal 100 does not receive a Probe response from the printer 10 even if a predetermined time has elapsed since the portable terminal 100 sent the Probe request in T130A, the portable terminal 100 again sends the Probe request including the SSID "wfdgo1" to the printer 10 via the Wi-Fi I/F 116 in T146.

When the printer 10 again receives the Probe request including the SSID "wfdgo1" from the portable terminal 100 via the Wi-Fi I/F 16 in T146, the printer 10 sends a Probe response to the portable terminal 100 via the Wi-Fi I/F 16 in T148.

In T176, the printer 10 performs a WPS communication according to the WPS with the portable terminal 100 via the Wi-Fi I/F 16, and sends the password "pass_wfd1" included in the WFD information WI1 in the memory 34 to the portable terminal 100.

In response to performing the WPS communication according to the WPS with the printer 10 via the Wi-Fi I/F 116 in T176, the portable terminal 100 shifts to a client state of the WFD scheme in T178. Subsequently, in T180, the portable terminal 100 performs communications of various signals (for example, an Authentication signal, an Association signal, and a 4-way handshake) with the printer 10. In the course of the various communications described above, the portable terminal 100 sends the password "pass_wfd1" received in T176 to the printer 10. Since an authentication of the password succeeds at the printer 10, the portable terminal 100 establishes a WFD connection with the printer 10. Accordingly, the portable terminal 100 can participate in the WFDNW as a child station (in other words, as a client).

From the perspective of the printer 10, in T180, the printer 10 performs the communications of the various signals with the portable terminal 100 via the Wi-Fi I/F 16. Accordingly, the printer 10 establishes the WFD connection with the portable terminal 100, and causes the portable terminal 100 to participate in the WFDNW as the child station (in other words, as the client).

When an operation of selecting an image of a print target is performed on the portable terminal 100, in T184, the printer 10 receives, using the WFDNW, a print performing request including image data representing the image from the portable terminal 100 via the Wi-Fi I/F 16. The print performing request is a request for causing the printer 10 to perform printing. In T186, the printer 10 performs printing of the image represented by the image data. Accordingly, the purpose of performing printing by receiving the print performing request from the portable terminal 100 is achieved.

After the communication of the print performing request has completed, in T188, the printer 10 stops the G/O and causes the WFDNW to disappear. Accordingly, the printer 10 shifts from the G/O state to the state where the printer 10 does not operate as a parent station of a wireless network. As a result, the WFD connection established in T180 is disconnected.

In T190, the printer 10 again forms the SoftAPNW that is identified by the SSID "softap" by activating the SoftAP. Accordingly, the printer 10 shifts from the state where the printer 10 does not operate as a parent station of a wireless network to the state where the printer 10 operates as the parent station of the SoftAPNW. Accordingly, after the purpose of performing printing by receiving the print performing request from the portable terminal 100 has been achieved, the printer 10 can appropriately achieve the purpose of acquiring the normal AP information AI for participating in the normal APNW from the portable terminal 100 (refer to FIG. 2).

Effect of Present Embodiment

A configuration of a comparative embodiment will be described before describing an effect of the present embodiment. While activating a SoftAP in order to achieve a purpose of acquiring normal AP information for participating in a normal APNW, a printer according to the comparative embodiment establishes a SoftAP connection with a portable terminal, and causes the portable terminal to participate in a SoftAPNW as a child station. Subsequently, using the SoftAPNW, the printer receives a print performing request from the portable terminal. However, in the configuration of the comparative embodiment, the printer monitors the reception of the normal AP information using the SoftAPNW in order to achieve the first purpose of acquiring the normal AP information, and thus even when the printer receives the print performing request using the SoftAPNW, the printer does not perform printing in accordance with the request. In other words, the printer cannot appropriately achieve the second purpose of the portable terminal causing the printer to perform printing.

In contrast, in the present embodiment, as shown in FIG. 3, the printer 10 operates as the SoftAP (T102 in FIG. 3) in order to achieve the first purpose of acquiring the normal AP information AI for participating in the normal APNW from the portable terminal 100. In addition, in order to achieve the second purpose of the portable terminal 100 causing the printer 10 to perform printing, the printer 10 receives, in response to the NFC wireless link being established (T124A), the Probe request including the SSID "wfdgo1" from the portable terminal 100 via the Wi-Fi I/F 16 (T130A). In this case, instead of operating as the parent station of the SoftAPNW for the first purpose, the printer 10 operates as the parent station of the WFDNW for the second purpose (T144), and causes the portable terminal 100 to participate in the WFDNW as a child station (T176, T180). In other words, the printer 10 can cause the portable terminal 100 to participate in the WFDNW as a child station for the second purpose, instead of causing the portable terminal 100 to participate in the SoftAPNW as a child station for the first purpose. As a result, using the WFDNW, the printer 10 can appropriately achieve the second purpose in accordance with the desire of the portable terminal 100. In particular, in the present embodiment, when the Probe request including the SSID "wfdgo1" is not received from the portable terminal 100 (NO in T140) despite the NFC wireless link having been established with the portable terminal 100, the state of the printer 10 is maintained in the SoftAP state. Therefore, when the Probe request including the SSID "wfdgo1" is not received from the portable terminal 100, the printer 10 can appropriately maintain the state where the SoftAPNW for the first purpose is formed.

In addition, in response to the NFC wireless link being established (T124A), the portable terminal 100 sends the Probe request including the SSID "wfdgo1" to the printer 10 via the Wi-Fi I/F 116 (T130A) while the printer 10 is operating as the SoftAP for the first purpose, in order to achieve the second purpose. Accordingly, instead of operating as the parent station of the SoftAPNW for the first purpose, the printer 10 operates as the parent station of the WFDNW for the second purpose (T144). As a result, the portable terminal 100 can participate in the WFDNW as a child station for the second purpose, instead of participating in the SoftAPNW as a child station for the first purpose. Therefore, using the WFDNW, the portable terminal 100 can appropriately achieve the second purpose.

(Correspondence Relationships)

The printer 10 and the portable terminal 100 are, respectively, examples of the "communication device" and the "terminal device". The NFC I/F 12 (or 112) and the Wi-Fi I/F 16 (or 116) are, respectively, examples of the "first wireless interface" and the "second wireless interface". The NFC wireless link in T124A in FIG. 3 and the SSID "wfdgo1" are, respectively, examples of the "wireless link" and "predetermined information". The state of operating as the SoftAP, the SSID "softap", and the SoftAPNW are, respectively, examples of the "first parent station state", the "first network identifier", and the "first wireless network". The G/O state, the SSID "wfdgo1", the WFDNW, and the WFD connection in T180 in FIG. 3 are, respectively, examples of the "second parent station state", the "second network identifier", the "second wireless network", and the "first wireless connection". The image data is an example of the "target data". The SoftAP connection in T26 in FIG. 2, the normal AP information AI, the normal AP connection in T34 in FIG. 2, and the normal APNW are, respectively, examples of the "third wireless connection", the "wireless setting information", the "fourth wireless connection", and the "fourth wireless network". The print application 138 and the setting application 140 are examples of the "non-transitory computer-readable medium storing computer-readable instructions".

Second Embodiment

In the present embodiment, in addition to the SoftAP information SI and the WFD information WI1, the memory 34 also stores WFD information WI2. The WFD information WI2 includes an SSID "wfdgo2" and a password "pass_wfd2". The WFD information WI2 is wireless setting information used in a WFDNW that is formed by the printer 10 operating as a G/O. The SSID "wfdgo2" and the password "pass_wfd2" are respectively different from the SSIDs and the passwords included in the SoftAP information SI and the WFD information WI1.

Further, in the present embodiment, in addition to the SSID "wfdgo1", the memory 14 of the NFC I/F 12 also stores the WFD information WI1 including the SSID "wfdgo1" and the password "pass_wfd1".

(Process by which Printer 10 Establishes WFD Connection: FIG. 4)

In the present embodiment, a process shown in FIG. 4 is performed instead of the process shown in FIG. 3. Contents of a process by which the printer 10 establishes a WFD connection with the portable terminal 100 in a situation where a SoftAP is activated on the printer 10 will now be described with reference to FIG. 4. T200 to T226 are same as T100 to T126A shown in FIG. 3.

T228 is same as T128A shown in FIG. 3 except the printer 10 sending the WFD information WI1 in the memory 14 to the portable terminal 100 (in other words, the portable terminal 100 receiving the WFD information WI1 from the printer 10).

T230 and T240 are respectively same as T130A and T140 shown in FIG. 3. Since the printer 10 receives the Probe request including the SSID "wfdgo1" (YES in T240), the printer 10 performs processes of T242 and thereafter. On the other hand, in the present embodiment as well, an NFC wireless link with the printer 10 may be established as in the case B shown in FIG. 3, even if the print application 138 is not activated. In this case, since the printer 10 does not receive the Probe request including the SSID "wfdgo1" (NO in T240), the printer 10 skips the processes of T242 and thereafter, and continues operating as the SoftAP.

T242 and T244 are respectively same as T142 and T144 shown in FIG. 3. In the present embodiment, a G/O activated in T244 and a WFDNW in which the G/O is a parent station will be respectively referred to as "first G/O" and "first WFDNW". T246 and T248 are respectively same as T146 and T148 shown in FIG. 3.

In T250, the printer 10 performs communications of various signals (for example, an Authentication signal, an Association signal, and a 4-way handshake) with the portable terminal 100. In the course of the various communications described above, the printer 10 receives the password "pass_wfd1" included in the WFD information WI1 from the portable terminal 100, and performs an authentication of the password. Since the authentication of the password succeeds, the printer 10 establishes a wireless connection (hereinafter, referred to as "legacy connection") with the portable terminal 100 that operates as a child station of the normal Wi-Fi scheme (in other words, as a so-called legacy) instead of as a client of the WFD scheme. Accordingly, the printer 10 can cause the portable terminal 100 to participate in the first WFDNW as a child station (in other words, a legacy).

From the perspective of the portable terminal 100, in T248, the portable terminal 100 receives the Probe response from the printer 10 via the Wi-Fi I/F 116, and in T250, the portable terminal 100 performs the communications of the various signals with the printer 10 via the Wi-Fi I/F 116. The communications of the various signals described above include sending the password "wfdgo1" received in T228 to the printer 10. Accordingly, the portable terminal 100 establishes the legacy connection with the printer 10, and participates in the first WFDNW as a child station.

In T252, using the first WFDNW, the portable terminal 100 sends a WPS request to the printer 10 via the Wi-Fi I/F 116. The WPS request is a command for requesting the printer 10 to perform a WPS communication.

In T252, using the first WFDNW, the printer 10 receives the WPS request from the portable terminal 100 via the Wi-Fi I/F 16. In this case, in T254, using the first WFDNW, the printer 10 sends a reception notice indicating that the WPS request has been received to the portable terminal 100 via the Wi-Fi I/F 16.

In T260, in response to sending the reception notice to the portable terminal 100, the printer 10 receives a disconnecting request from the portable terminal 100. The disconnecting request is a command for requesting the printer 10 to disconnect the legacy connection. Accordingly, in T262, the printer 10 disconnects the legacy connection and sends a disconnection notice indicating that the legacy connection has been disconnected to the portable terminal 100 via the Wi-Fi I/F 16.

Subsequently, in T264, the printer 10 stops the first G/O and causes the first WFDNW to disappear.

In T270, the printer 10 activates a G/O and forms a WFDNW that is identified by the SSID "wfdgo2". Hereinafter, the G/O activated in T270 and the WFDNW in which the G/O is a parent station will be respectively referred to as "second G/O" and "second WFDNW".

In T272, in response to receiving the disconnection notice from the printer 10, the portable terminal 100 sends a Discovery request to the printer 10 via the Wi-Fi I/F 116. The Discovery request is a command for requesting the SSID "wfdgo2" for identifying the second WFDNW to be sent. In T274, in response to sending the Discovery request to the printer 10, the portable terminal 100 receives a Discovery response including the SSID "wfdgo2" from the printer 10 via the Wi-Fi I/F 116. Accordingly, the portable terminal 100 can be informed of the SSID "wfdgo2" for identifying the second WFDNW.

From the perspective of the printer 10, the printer 10 receives the Discovery request from the portable terminal 100 via the Wi-Fi I/F 16 in T272, and in T274, the printer 10 sends the Discovery response including the SSID "wfdgo2" to the portable terminal 100 via the Wi-Fi I/F 16. Subsequently, in T276, the printer 10 performs a WPS communication in accordance with the WPS request received in T252 with the portable terminal 100 via the Wi-Fi I/F 16, and sends the password "pass_wfd2" included in the WFD information WI2 in the memory 34 to the portable terminal 100.

From the perspective of the portable terminal 100, in response to performing the WPS communication in accordance with the WPS request with the printer 10 via the Wi-Fi I/F 116, the portable terminal 100 receives the password "pass_wfd2" from the printer 10. T278 is same as T178 shown in FIG. 3. T280 is same as T180 shown in FIG. 3 except for the portable terminal 100 sending the password "pass_wfd2" received in T276 to the printer 10 in the course of the communications of the various signals, and for the portable terminal 100 participating in the second WFDNW as a child station (in other words, a client according to the WFD scheme) (in other words, the printer 10 causing the portable terminal 100 to participate in the second WFDNW as a child station). When the process of T280 is performed, the processes of T184 to T190 shown in FIG. 3 are performed. These processes are same as those shown in FIG. 3 except for the second WFDNW being used in T184 and for the second G/O being stopped in T188.

Effect of Present Embodiment

In the present embodiment, the portable terminal 100 cannot establish the WFD connection of T280 with the printer 10 unless the legacy connection of T250 is established with the printer 10 and the WPS request of T252 is sent to the printer 10. In order to address such a constrain of the portable terminal 100, in response to receiving the Probe request including the SSID "wfdgo1" (T230), the printer 10 operates as the parent station of the first WFDNW for the second purpose (T244) instead of operating as the parent station of the SoftAPNW for the first purpose, and causes the portable terminal 100 to participate in the first WFDNW as a child station (in other words, as a legacy) (T250). Then, using the first WFDNW, the printer 10 receives the WPS request from the portable terminal 100 (T252). Subsequently, the printer 10 operates as the second G/O to form the second WFDNW (T270), and performs the WPS communication in response to receiving the WPS request from the portable terminal 100 (T276). Accordingly, the printer 10 can cause the portable terminal 100 to participate in the second WFDNW as a child station (in other words, as a client) (T280). Then, using the second WFDNW, the printer 10 can appropriately achieve printing in accordance with receiving a print performing request from the portable terminal 100, in other words, the second purpose.

(Correspondence Relationships)

The state where the printer 10 operates as the first G/O, the first WFDNW, and the legacy connection in T250 are, respectively, examples of the "second parent station state", the "second wireless network", and the "first wireless connection". The password "pass_wfd1" is an example of the "first password". The state where the printer 10 operates as the second G/O, the second WFDNW, and the WFD connection in T280 are, respectively, examples of the "third parent station state", the "third wireless network", and the "second wireless connection". The SSID "wfdgo2" and the password "pass_wfd2" are, respectively, examples of the "third network identifier" and the "second password". The Discovery request is an example of the "identifier request".

(First Modification)

For each of a plurality of printer model names, the print application 138 may include information in which, for example, a model name and an SSID for identifying a WFDNW formed by a printer having the model name is associated with each other. In addition, the memory 14 of the NFC I/F 12 may store a model name of the printer 10 instead of the SSID "wfdgo1". In this case, in T128A shown in FIG. 3, the NFC I/F 12 of the printer 10 may send the model name to the portable terminal 100 in response to receiving the Read request. Subsequently, in T130A, the portable terminal 100 may acquire the SSID "wfdgo1" associated with the model name from the print application 138, and send the Probe request including the acquired SSID "wfdgo1" to the printer 10. Generally speaking, the "first wireless interface" may not send predetermined information to the terminal device using a wireless link.

(Second Modification)

The memory 14 of the NFC I/F 12 may store a specific MAC address for identifying the Wi-Fi I/F 16 instead of the SSID "wfdgo1". In this case, in T128A shown in FIG. 3, the NFC I/F 12 of the printer 10 may send the specific MAC address to the portable terminal 100 in response to receiving the Read request, and in T130A, the printer 10 may receive a Probe request including the specific MAC address from the portable terminal 100. Subsequently, in T140, the printer 10 may determine whether the Probe request including the specific MAC address is received. In the present modification, the specific MAC address is an example of the "predetermined information".

(Third Modification)

In the embodiments described above, in T12 shown in FIG. 2, the printer 10 may activate a G/O of the WFD scheme instead of activating the SoftAP, and form a WFDNW. An SSID for identifying the WFDNW is different from the SSID for identifying the WFDNW formed in T144 shown in FIG. 3. In addition, the printer 10 may establish a WFD connection with the portable terminal 100 in T26 shown in FIG. 2, and receive the normal AP information AI from the portable terminal 100 in T28 using the WFDNW. Generally speaking, the "first parent station state" may not be a state where a SoftAP is activated, and may be a state where a G/O is activated.

(Fourth Modification)

The processes of T272 and T274 shown in FIG. 4 may not be performed. In this case, for example, the printer 10 may send a reception notice including the SSID "wfdgo2" to the portable terminal 100 in T254. In addition, for example, the printer 10 may receive a WPS request including the SSID "wfdgo2" from the portable terminal 100 in T252, and in T270, the printer 10 may activate the second G/O and form the second WFDNW identified by the received SSID "wfdgo2". In the present modification, the "receive an identifier request for requesting a transmission of the third network identifier" and the "send the third network identifier to the terminal device" can be omitted.

(Fifth Modification)

The process of T190 shown in FIG. 3 may not be performed. In the present modification, the "shift the state of the communication device from the third parent station state to the first parent station state" can be omitted.

(Sixth Modification)

In the embodiments described above, the SoftAPNW is used to achieve the purpose of the printer 10 acquiring the normal AP information. Instead, the SoftAPNW may be used to achieve a purpose of the printer 10 acquiring a setting value, a purpose of the printer 10 acquiring an update file for updating the program 36, and the like. In the present modification, the "receive wireless setting information from the terminal device" and the "establish a fourth wireless connection" can be omitted.

(Seventh Modification)

The "communication device" may not be a printer, and may be, for example, a scanner, a multifunctional device, a server, or a PC. For example, in the case where the communication device is a scanner, when receiving a scan request from the portable terminal 100 in T184 in FIG. 3, the communication device may perform scanning of a target document and send scan data representing the target document to the portable terminal 100 in T186. In the present modification, the scan data is an example of the "target data".

(Eighth Modification)

The "first wireless interface" may not be an NFC I/F, and may be, for example, a BT (abbreviation of Bluetooth (registered trademark)) interface capable of performing a BT communication.

(Ninth Modification)

In the second embodiment described above, in T270, the printer 10 operates as a parent station of the second WFDNW identified by the SSID "wfdgo2" that is different from the SSID "wfdgo1" for identifying the first WFDNW in T244. Instead, the printer 10 may operate as a parent station of a second WFDNW that is identified by the same SSID as the SSID "wfdgo1" for identifying the first WFDNW. Generally speaking, the "third network identifier" may be the same as the "second network identifier".

(Tenth Modification)

In the embodiments described above, the processes shown in FIGS. 2 to 4 are realized by the CPU 32 of the printer 10 performing the program 36 (in other words, software) and the CPU 132 of the portable terminal 100 performing the programs 136, 138, and 140. Alternatively, any of the processes may be realized by hardware such as a logic circuit.

What is claimed is:

1. A communication device comprising:
a first wireless interface;
a second wireless interface being different from the first wireless interface, the second wireless interface being an interface configured to perform a wireless communication according to a specific scheme;
a processor; and
a memory configured to store computer-readable instructions therein, the computer-readable instructions, when executed by the processor, causing the communication device to:
in response to a wireless link via the first wireless interface being established with a terminal device while a state of the communication device is a first parent station state, receive predetermined information from the terminal device via the second wireless interface, the first parent station state being a state where the communication device operates as a parent station of a first wireless network according to the specific scheme, the first wireless network being identified by a first network identifier, the first wireless network being for performing a wireless communication via the second wireless interface;
in a case where the predetermined information is received, shift the state of the communication device from the first parent station state to a second parent station state, the second parent station state being a state where the communication device operates as a parent station of a second wireless network according to the specific scheme and the communication device does not operate as the parent station of the first wireless network according to the specific scheme, the second wireless network being identified by a second network identifier different from the first network identifier, the second wireless network being for performing a wireless communication via the second wireless interface; and
after the predetermined information has been received and the state of the communication device has been shifted from the first parent station state to the second parent station state, establish a first wireless connection via the second wireless interface with the terminal device so as to cause the terminal device to participate in the second wireless network as a child station,
wherein in a case where the predetermined information is not received even if the wireless link via the first wireless interface has been established with the terminal device while the state of the communication device is the first parent station state, the state of the communication device is maintained in the first parent station state.

2. The communication device as in claim 1, wherein the first wireless interface is configured to send the predetermined information to the terminal device by using the wireless link.

3. The communication device as in claim 1, wherein the predetermined information includes the second network identifier.

4. The communication device as in claim 1, wherein the first wireless interface is configured to send a first password to be used in the second wireless network to the terminal device by using the wireless link, and the first wireless connection is established by using the first password.

5. The communication device as in claim 4, wherein the computer-readable instructions, when executed by the processor, further cause the communication device to:
receive a WPS (abbreviation of Wi-Fi Protected Setup) request from the terminal device via the second wireless interface by using the second wireless network, the WPS request being for requesting a performance of a WPS communication;
after the WPS request has been received, shift the state of the communication device from the second parent station state to a third parent station state, the third parent station state being a state where the communication device operates as a parent station of a third wireless network identified by a third network identifier different from the first network identifier, and does not operate as the parent station of the second wireless network, the third wireless network being for performing a wireless communication via the second wireless interface;
after the state of the communication device has been shifted from the second parent station state to the third parent station state, perform the WPS communication according to the WPS request with the terminal device via the second wireless interface, so as to send a second password to be used in the third wireless network to the terminal device; and
establish a second wireless connection via the second wireless interface with the terminal device by using the second password, so as to cause the terminal device to participate in the third wireless network as a child station.

6. The communication device as in claim 5, wherein the third network identifier is different from the second network identifier, and
the computer-readable instructions, when executed by the processor, further cause the communication device to:
after the state of the communication device has been shifted from the second parent station state to the third parent station state, receive an identifier request from the terminal device via the second wireless interface, the identifier request being for requesting a transmission of the third network identifier; and
in a case where the identifier request is received, send the third network identifier to the terminal device via the second wireless interface.

7. The communication device as in claim 5, wherein the computer-readable instructions, when executed by the processor, further cause the communication device to:
after the terminal device has participated in the third wireless network as the child station, perform a wireless communication of target data with the terminal device via the second wireless interface by using the third wireless network; and
after the wireless communication of the target data has been completed, shift the state of the communication device from the third parent station state to the first parent station state.

8. The communication device as in claim 1, wherein the computer-readable instructions, when executed by the processor, further cause the communication device to:
after the terminal device has participated in the second wireless network as the child station, perform a wireless communication of target data with the terminal device via the second wireless interface by using the second wireless network; and
after the wireless communication of the target data has been completed, shift the state of the communication device from the second parent station state to the first parent station state.

9. The communication device as in claim 1, wherein the computer-readable instructions, when executed by the processor, further cause the communication device to:
while the state of the communication device is the first parent station state, establish a third wireless connection via the second wireless interface with the terminal device so as to cause the terminal device to participate in the first wireless network as a child station;
after the terminal device has participated in the first wireless network as the child station, receive wireless setting information from the terminal device via the second wireless interface by using the first wireless network, the wireless setting information being information for participating in a fourth wireless network as a child station, the fourth wireless network being a wireless network in which an access point operates as a parent station, the access point being different from the communication device and the terminal device; and
establish a fourth wireless connection via the second wireless interface with the access point by using the wireless setting information so as to participate in the fourth wireless network as the child station.

10. The communication device as in claim 1, wherein the first wireless interface is an interface for performing a wireless communication according to an NFC (abbreviation of Near Field Communication) scheme; the specific scheme a Wi-Fi scheme;
the first wireless network is a wireless network according to a SoftAP (abbreviation of Software Access Point) scheme based on the specific scheme;
the first parent station state is a state where a SoftAP is activated;
the second wireless network is a wireless network according to a WFD (abbreviation of Wi-Fi Direct (registered mark)) scheme based on the specific scheme; and
the second parent station state is a Group Owner state of the WFD scheme.

11. A non-transitory computer-readable medium storing computer-readable instructions for a terminal device,
the computer-readable instructions, when executed by a processor of the terminal device, causing the terminal device to;
in response to a wireless link via a first wireless interface of the terminal device being established with a communication device while a state of the communication device is a first parent station state, send predetermined information to the communication device via a second wireless interface of the terminal device, the second wireless interface being different from the first wireless interface, the second wireless interface being an interface configured to perform a wireless communication according to a specific scheme, the first parent station state being a state where the communication device operates as a parent station of a first wireless network according to the specific scheme, the first wireless network being identified by a first network identifier, the predetermined information being information for shifting the state of the communication device from the first parent station state to a second parent station state, the second parent station state being a state where the communication device operates as a parent station of a second wireless network according to the specific scheme and the communication device does not operate as the parent station of the first wireless network according to the specific scheme, the second wireless network identified by a second network identifier different from the first network identifier; and
after the predetermined information has been sent and the state of the communication device has been shifted from the first parent station state to the second parent station state, establish a first wireless connection via the second wireless interface with the communication device so as to participate in the second wireless network as a child station.

12. The non-transitory computer-readable medium as in claim 11, wherein
the first wireless interface receives the predetermined information from the communication device by using the wireless link.

13. The non-transitory computer-readable medium as in claim 11, wherein
the predetermined information includes the second network identifier.

14. The non-transitory computer-readable medium as in claim 11, wherein
the first wireless interface receives a first password to be used in the second wireless network from the communication device by using the wireless link, and
the first wireless connection is established by using the first password.

15. The non-transitory computer-readable medium as in claim 14, wherein the computer-readable instructions, when executed by the processor of the terminal device, further cause the terminal device to:
send a WPS (abbreviation of Wi-Fi Protected Setup) request to the communication device via the second wireless interface by using the second wireless network, the WPS request being for requesting a performance of a WPS communication, wherein after the WPS request has been sent, the state of the communication device is shifted from the second parent station state to a third parent station state, the third parent station state being a state where the communication device operates as a parent station of a third wireless network identified by a third network identifier different from the first network identifier;
after the state of the communication device has been shifted from the second parent station state to the third parent station state, perform the WPS communication according to the WPS request with the communication device via the second wireless interface, so as to receive a second password to be used in the third wireless network from the communication device; and
establish a second wireless connection via the second wireless interface with the communication device by using the second password, so as to participate in the third wireless network as a child station.

16. The non-transitory computer-readable medium as in claim 15, wherein
the third network identifier is different from the second network identifier, and
the computer-readable instructions, when executed by the processor of the terminal device, further cause the terminal device to:
after the state of the communication device has been shifted from the second parent station state to the third parent station state, send an identifier request to the communication device via the second wireless interface, the identifier request being for requesting a transmission of the third network identifier; and
in a case where the identifier request is sent, receive the third network identifier from the communication device via the second wireless interface.

17. The non-transitory computer-readable medium as in claim 11, wherein
the computer-readable instructions, when executed by the processor of the terminal device, further cause the terminal device to:
while the state of the communication device is the first parent station state, establish a third wireless connection via the second wireless interface with the communication device so as to participate in the first wireless network as a child station; and
send wireless setting information to the communication device via the second wireless interface by using the first wireless network, the wireless setting information being information for participating in a fourth wireless network as a child station, the fourth wireless network being a wireless network in which an access point operates as a parent station, the access point being different from the communication device and the terminal device.

18. The non-transitory computer-readable medium as in claim 11, wherein
the first wireless interface is an interface for performing a wireless communication according to an NFC (abbreviation of Near Field Communication) scheme;
the specific scheme is a Wi-Fi scheme;
the first wireless network is a wireless network according to a SoftAP scheme based on the specific scheme;
the first parent station state is a state that a SoftAP is activated;
the second wireless network is a wireless network according to a WFD (abbreviation of Wi-Fi Direct (registered mark)) scheme based on the specific scheme; and
the second parent station state is a Group Owner state of the WFD scheme.

19. A terminal device comprising:
a first wireless interface;
a second wireless interface being different from the first wireless interface;
a processor; and
a memory configured to store computer-readable instructions therein, the computer-readable instructions, when executed by the processor, causing the terminal device to:
in response to a wireless link via the first wireless interface being established with a communication device while a state of the communication device is a first parent station state, send predetermined information to the communication device via the second wireless interface, the second wireless interface being different from the first wireless interface, the second wireless interface being an interface configured to perform a wireless communication according to a specific scheme, the first parent station state being a state where the communication device operates as a parent station of a first wireless network according to the specific scheme, the first wireless network being identified by a first network identifier, the predetermined information being information for shifting the state of the communication device from the first parent station state to a second parent station state, the second parent station state being a state where the communication device operates as a parent station of a second wireless network according to the specific scheme and the communication device does not operate as the parent station of the first wireless network according to the specific scheme, the second wireless network identified by a second network identifier different from the first network identifier; and
after the predetermined information has been sent and the state of the communication device has been shifted from the first parent station state to the second parent station state, establish a first wireless connection via the second wireless interface with the communication device so as to participate in the second wireless network as a child station.

* * * * *